US011053402B2

(12) United States Patent
Ugoletti et al.

(10) Patent No.: US 11,053,402 B2
(45) Date of Patent: Jul. 6, 2021

(54) BLACK INK

(71) Applicant: JK Group S.P.A., Novedrate (IT)

(72) Inventors: Marco Ugoletti, Milan (IT); Luca Guggiari, Como (IT)

(73) Assignee: JK Group S.P.A., Novedrate (IT)

( * ) Notice: Subject to any disclaimer, the term of this patent is extended or adjusted under 35 U.S.C. 154(b) by 137 days.

(21) Appl. No.: 16/496,277

(22) PCT Filed: Mar. 22, 2018

(86) PCT No.: PCT/IB2018/051934
§ 371 (c)(1),
(2) Date: Sep. 20, 2019

(87) PCT Pub. No.: WO2018/172972
PCT Pub. Date: Sep. 27, 2018

(65) Prior Publication Data
US 2020/0032087 A1   Jan. 30, 2020

(30) Foreign Application Priority Data

Mar. 23, 2017   (IT) .................. 102017000032299

(51) Int. Cl.
| *C09D 11/324* | (2014.01) |
| *C09D 11/328* | (2014.01) |
| *C09D 11/40* | (2014.01) |
| *D06P 3/54* | (2006.01) |
| *D06P 5/20* | (2006.01) |
| *D06P 5/30* | (2006.01) |
| *C09K 109/00* | (2006.01) |

(52) U.S. Cl.
CPC .......... *C09D 11/324* (2013.01); *C09D 11/328* (2013.01); *C09D 11/40* (2013.01); *D06P 3/54* (2013.01); *D06P 5/2066* (2013.01); *D06P 5/30* (2013.01); *C09K 2109/00* (2013.01)

(58) Field of Classification Search
None
See application file for complete search history.

(56) References Cited

U.S. PATENT DOCUMENTS

| 7,211,130 | B1 | 5/2007 | Chevli | |
| 2007/0030324 | A1 | 2/2007 | Chevli | |
| 2007/0085888 | A1 | 4/2007 | Chevli | |
| 2007/0107626 | A1 | 5/2007 | Chevli | |
| 2014/0267514 | A1* | 9/2014 | Mizutaki | C09D 11/00 347/100 |
| 2015/0017402 | A1* | 1/2015 | Suzuki | C09D 11/328 428/199 |
| 2015/0240091 | A1 | 8/2015 | Tabayashi et al. | |
| 2016/0208119 | A1* | 7/2016 | Oguchi | C08K 5/18 |
| 2020/0283952 | A1* | 9/2020 | Doumaux | C09D 17/001 |
| 2021/0087416 | A1* | 3/2021 | Ugoletti | D06P 5/2077 |

FOREIGN PATENT DOCUMENTS

| EP | 3023464 | A2 * | 5/2016 |
| WO | WO 2018/178890 | A1 * | 10/2019 |

OTHER PUBLICATIONS

PCT International Search Report and Written Opinion in International Appln. No. PCT/IB2018/051934, dated Jun. 15, 2018, 8 pages.

* cited by examiner

*Primary Examiner* — Helene Klemanski
(74) *Attorney, Agent, or Firm* — Fish & Richardson P.C.

(57) ABSTRACT

The invention relates to a black ink comprising a black dye dispersion in an aqueous vehicle comprising disperse blue 291 and/or 291:1, disperse red 82 and disperse red 54 and the use of such black ink in a method for digital inkjet-printing of a fabric, preferably on polyester.

21 Claims, No Drawings

BLACK INK

CROSS-REFERENCE TO RELATED APPLICATIONS

This application is a U.S. National Stage Entry under 35 USC § 371 of International Patent Application No. PCT/IB2018/051934, filed on Mar. 22, 2018, which claims the benefit of Italian Patent Application No. 102017000032299, filed on Mar. 23, 2017, both of which are hereby incorporated by reference in their entirety.

FIELD OF THE INVENTION

The invention relates to a black ink comprising a mixture of the dyes disperse blue 291 and/or 291:1, disperse red 82 and disperse red 54 and to an ink set for inkjet-printing comprising said black ink. The use of said black ink in a method for inkjet-printing on fabric, preferably made of polyester or polyester blends, is a further object of the invention.

BACKGROUND ART

Inkjet-printing is a particular method of digital printing in which the pattern to be printed is created through appropriate graphic software and impressed directly on the substrate to be printed through an ink jet, which projects tiny droplets of ink onto said support. Ejection of the ink can be continuous or only when required (Drop On Demand, referred to as DOD). In turn, in the DOD system the ejection mechanism of the drops can be of two types: thermal or piezoelectric. In the first case, a resistor through which current pulses are passed is positioned at each nozzle; at each pulse, the resistor heats up to the temperature of a few hundred degrees in a few microseconds and generates a bubble of vapour in the ink in contact therewith. The expansion of the latter causes the ejection of the drop from the overlying nozzle. In the second case, a small channel surrounded by a piezoelectric crystal is placed under each nozzle; an electric pulse causes the crystal to deform and consequently the sudden narrowing of the channel and the ejection of the ink.

In recent years, digital inkjet-printing has become increasingly important as a fabric printing method as it has several advantages over conventional printing methods, such as silk screen printing. In fact, digital inkjet-printing eliminates the high costs related to the creation of the screen printing tool which, for a small quantity of items, is uneconomical. Furthermore, digital inkjet-printing allows the use of a large number of colours and gradients thereof. Finally, faster inkjet printers are now available on the market and therefore suitable to be used industrially; these printers have ink heads having a large number of nozzles compatible with water-based inks. Digital inkjet printers suitable for the use of water-based inks are for example Artistri® 2020 and 3210 Textile (E.I. du Pont de Nemours), Textile Jet (Mimaki), Display-Maker Fabrijet (MacDerm id Color Span), Amber, Zircon, Amethyst and Pike (Stork), JP and Lario series (MS Printing Solutions), Rhotex and Kappa (Durst), Vutek (Efi), Renoir (Efi-Reggiani), Monnalisa (Robustelli) series.

Polyester is one of the most used synthetic fibres in the textile industry; it can be used alone or with other natural or synthetic fibres, it can have variable thickness and can be processed to adapt to different conditions of use. Polyester can be used in blends with cotton or nylon, polypropylene, Lycra, etc., to make virtually any piece of clothing, such as shirts, trousers, jackets, underwear, gloves, etc. Polyester is also increasingly used as a padding for winter clothing, as a starting fibre to obtain fleece and as a transpiring material, in the polyester variety with hollow cores, for technical-sports clothing.

Disperse dyes are widely used in textile printing, in particular in the printing of hydrophobic fibres such as polyester and cellulose acetates.

Dispersed dye systems must have specific requirements to be used in digital inkjet-printing on fabrics, for example capacity to pass through the printer nozzles, stability during use and storage, color properties, such as for example intensity.

A black ink based on water and dispersed dyes having good color intensity is described in U.S. Pat. No. 7,221,130.

Nevertheless, it is still particularly felt the need to obtain a black ink with high intensity, i.e. having a high optical density, not only when the fabric is printed with large amounts of ink, but also for print areas with lower amount of ink, such that black remains intense without rapidly decline to grey.

SUMMARY OF THE INVENTION

The present inventors have found that a black ink comprising a specific disperse dye mixture gives the fabrics a high optical density coloration even for reduced amounts of ink deposited.

The lower tendency to lighten of the black ink according to the invention leads to a series of advantages, including:
  Possibility of generating a smaller volume of drops maintaining good intensity with the same resolution; this can result in an increase in the printing definition, and/or in a possible increase in the ejection frequency and therefore a higher printing speed;
  Achievement of high optical densities even at lower printing resolutions.

Therefore, a first object of the present invention is a black ink suitable for use in inkjet printing, comprising a mixture of the dyes disperse blue 291 and/or 291:1, disperse red 82, and disperse red 54.

A second object of the present invention is a ink set comprising:
  a black ink according to the first object of the invention, and
  at least one colored ink selected from cyan, magenta, yellow, red, violet, orange and blue, comprising at least one disperse dye in an aqueous vehicle.

A third object of the present invention is a method for inkjet-printing on a fabric using an ink according to the first object of the invention or an ink set according to the second object of the invention.

Preferably, said method comprises the following steps:
  (a) providing an inkjet printer responsive to digital signals,
  (b) loading the printer with a fabric to be printed,
  (c) loading the printer with a black ink according to the first object of the invention or an ink set according to the second object of the invention,
  (d) printing the fabric by using said black ink or ink set in response to a digital signal and, optionally
  (e) fixing the inks printed on the fabric by heat,
  (f) washing the fabric thus treated.

A fourth object of the present invention is the use of a black ink according to the first object of the invention or of an ink set according to the second object of the invention in inkjet-printing.

A fifth object of the invention is a composition for preparing a black ink according to the invention comprising the following mixture of disperse dyes in an aqueous vehicle:
- from 6 to 20%, preferably from 8 to 14%, still more preferably from 9 to 11%, still more preferably 10.4% by weight of disperse blue 291 and/or 291:1;
- from 1 to 8%, preferably from 3 to 5%, still more preferably 3.6% by weight of disperse red 82,
- from 1 to 10%, preferably from 2 to 7%, still more preferably 6% by weight of disperse red 54, based on the total weight of the composition.

Definitions

The dispersed dyes of the present invention are substantially insoluble in the aqueous vehicle and are dispersed in conventional dispersants known to the man skilled in the art by dispersing techniques commonly used in the preparation of inkjet-printing inks.

The dispersed dyes of the present invention are identified by the designation "C.I.", established by Society Dyers and Colourists, Dradford, Yorkshire, UK, published in Color Index, 3rd edition, 1971.

In the present invention, the color of the printed ink was evaluated by the colorimetric model L*a*b* encoded by the International Commission of Illumination (CIE) and also known as CIEL*a*b*. Using this model, the color is identified by three values: L*, luminance, whose values range from 0 to 100; a* and b*, two color coordinates that indicate the tendency to green color (a*<0)/red (a*>0) as well as to blue (b*<0)/yellow (b*>0) with values from −120 to +120. Using the L*a*b* scale as a color measurement system, it is possible to compare the ink of the invention with inks formulated with different C.I. having the same concentration. In particular, for blacks it is important to consider the luminance value L*, which theoretically ranges from 0 to 100. The higher the L* value, the lighter the printed artefact will be. By comparing the variation of L* at different amounts of ink printed for the different formulations, it is possible to measure the different tendency of the ink to lighten.

By "printed ink quantity" according to the present invention it is meant the weight of the ink per unit of fabric surface, which is measured as g of ink/$m^2$ of fabric (g/$m^2$).

By "aqueous vehicle" according to the present invention it is meant a solution, suspension or emulsion in which the dyes are dispersed. The aqueous vehicle consists of an aqueous solvent and any ink additives, when present, and therefore consists in all components of the ink other than dyes.

By "aqueous solvent" according to the present invention it is meant water or a mixture of water and organic solvents miscible in water.

By "additives" or "ink additives" according to the present invention it is meant all the components of an ink other than the dyes and the aqueous solvent.

DETAILED DESCRIPTION OF THE INVENTION

The first object of the present invention is a black ink suitable for use in inkjet printing, comprising a mixture of the dyes disperse blue 291 and/or 291:1, disperse red 82 and disperse red 54.

Preferably, said black ink does not contain any other dyes in addition to the above mixture of dyes. In this preferred embodiment, the dyes present in the black ink according to the first object of the invention consist in the aforementioned mixture.

Preferably, the black ink according to the first object of the invention comprises
- from 3 to 10% by weight of disperse blue 291 and/or 291:1,
- from 0.5 to 4% by weight of disperse red 82, and
- from 0.5 to 5% by weight of disperse red 54, based on the total weight of the ink.

More preferably, the black ink according to the first object of the invention comprises:
- from 4 to 7%, more preferably from 4.5 to 5.5%, still more preferably 5.2% by weight, of disperse blue 291 and/or 291:1, preferably disperse blue 291:1.
- from 1.5 to 2.5%, more preferably 1.8% by weight of disperse red 82, and
- from 1 to 3.5%, more preferably 3% by weight of disperse red 54, based on the total weight of the ink.

According to a particularly preferred embodiment, the black ink according to the first object of the invention comprises 5.2% by weight of disperse blue 291 and/or 291:1, 1.8% by weight of disperse red 82, and 3% by weight of disperse red 54, based on the total weight of the ink.

Preferably, the black ink according to the invention comprises only one disperse blue dye selected from, alternatively, disperse blue 291 and disperse blue 291:1. More preferably, said blue dye is disperse blue 291:1.

Preferably, said mixture of dyes is dispersed in an aqueous vehicle, preferably consisting of an aqueous solvent and, optionally, additives of the ink.

Preferably, the black ink according to the first object of the invention comprises:
- from 70 to 98%, preferably from 70 to 95%, more preferably from 88 to 92%, even more preferably 90% by weight of aqueous vehicle and from 2 to 30%, preferably from 5 to 30%, more preferably from 8 to 12%, still more preferably 10% by weight of said mixture of dyes, based on the total weight of the ink.

The ink drop rate, the length of the drop ligament, the size and stability of the drop flow are strongly influenced by the surface tension and viscosity of the ink.

Therefore, preferably, the black ink according to the first object of the invention has a surface tension comprised between 20 and 40 mN/m, more preferably comprised between 25 and 35 mN/m at 25° C. and/or a viscosity comprised between 3 and 9 mPa*s, more preferably comprised between 4 and 8 m Pes at 25° C.

A second object of the present invention is a ink set for inkjet-printing comprising
- a black ink according to the first object of the invention, and
- at least one colored ink selected among cyan, magenta, yellow, red, violet, orange and blue, comprising at least one disperse dye in an aqueous vehicle, as defined above.

In a preferred embodiment of the second object of the invention, the set comprises a black ink according to the first object of the invention and cyan, magenta, yellow, red, violet, orange and blue inks, each comprising at least one disperse dye in an aqueous vehicle.

According to the second object of the present invention, the cyan ink preferably comprises at least one disperse dye selected from DB60, DB56, DB27, DB87, DB257, DB367 and mixtures thereof.

According to the second object of the present invention, the magenta ink preferably comprises at least one disperse dye selected from DR76, DR92, DR86, DR89, DR5, DR75, DR121, DR127, DR132, DR145, DR159, DR164, DR179, DR184, DR189, DR191 and mixtures thereof.

According to the second object of the present invention, the yellow ink preferably comprises at least one disperse dye selected from DY5, DY42, DY33, DY50, DY59, DY114, DY79, DY83, DY98, DY100, DY122, DY139, DY140, DY160, DY199, DY201, DY204, DY206, DY224, DY231 and mixtures thereof.

According to the second object of the present invention, the red ink preferably comprises at least one disperse dye selected from DR54, DR177, DR229, DR258 and mixtures thereof.

According to the second object of the present invention, the violet ink preferably comprises at least one disperse dye selected from DV26, DV57, DV37 and mixtures thereof.

According to the second object of the present invention, the orange ink preferably comprises at least one disperse dye selected from DO44, DO29, DO30 and mixtures thereof.

According to the second object of the present invention, the blue ink preferably comprises at least one disperse dye selected from DB77, DB77:1, DB79, DB79:1, DB291:1, DB165, DB165:1, DB73 and mixtures thereof.

According to the second object of the present invention, the at least one colored ink can be in the "light" version, containing a lower concentration of dyes.

According to the second object of the invention, the set may also include a further ink colored in a different way or with color gradations different from those listed and comprising a disperse dye.

According to the first and/or second object of the invention, preferably the aqueous vehicle contains water as aqueous solvent, optionally mixed with one or more organic solvents.

Preferably, the black ink according to the invention comprises from 60 to 90%, preferably from 65 to 85%, more preferably from 70 to 80% by weight of water, based on the total weight of the ink.

The type of organic solvent used in the aqueous vehicle of the ink according to the first and/or second object of the invention and the amount thereof depend on the type of application, and on the desired surface tension, viscosity and vapour pressure of the ink, on its solubility in water, on the dye used and on the compatibility with the materials constituting the printing apparatus as well as on the substrate on which the ink is to be printed.

Examples of water-miscible organic solvents, usable in the aqueous vehicle of the above black or colored ink, include alcohols, ketones, keto-alcohols, ethers and others, such as thiodiglycol, sulfolane, 2-pyrrolidone, 1,3-dimethyl-2-imidazolidinone and caprolactam; glycols such as ethylene glycol, diethylene glycol, triethylene glycol, tetraethylene glycol, propylene glycol, dipropylene glycol, tripropylene glycol, trimethylene glycol, butylene glycol and hexylene glycol; addition polymers of oxyethylene or oxypropylene, such as polyethylene glycol, polypropylene glycol and the like; triols such as glycerol and 1,2,6-hexanotriol; lower alkyl ethers of polyhydric alcohols, such as ethylene glycol monomethyl ether, ethylene glycol monoethyl ether, diethylene glycol monomethyl ether, diethylene glycol monoethyl ether; lower dialkyl ethers of polyhydric alcohols, such as diethylene glycol dimethyl or diethyl ether.

The organic solvent is present in the aqueous vehicle of the ink according to the first and/or second object of the invention in an amount of from 2 to 70%, preferably from 5 to 50%, more preferably from 5 to 30%, still more preferably from the 7 to 25%, based on the total weight of the aqueous vehicle.

According to a preferred embodiment of the black ink according to the first object of the invention, the aqueous solvent consists of a mixture of water, glycerol and propylene glycol. Preferably, in this case, the black ink comprises, based on the total weight of the ink, from 2 to 15%, preferably from 5 to 10%, more preferably from 7 to 9%, still more preferably 8.5% by weight of glycerol, from 1 to 3%, preferably from 1.5 to 2.5%, more preferably 2% by weight of propylene glycol and from 60 to 90%, preferably from 65 to 85%, more preferably from 70 to 80% by weight of water.

According to the first and second objects of the invention, the aqueous vehicle further comprises additives typically used in dispersed inks, insofar as they do not interfere with the stability and the capacity of the final ink to be ejected.

In particular, in the aqueous vehicle according to the first object of the invention, the additives, when present, are less than 15% by weight, based on the total weight of the ink.

Such additives, well known to the man skilled in the art and commonly used in the field, include: surfactants to adjust surface tension and wettability; dispersing polymers to improve stability; biocides to inhibit the growth of microorganisms; pH regulators; sequestering agents (i.e. chelating agents) to eliminate the effects of any metal ions present as impurities.

Surfactants suitable as additives are for example ethoxylated acetylenic diols (i.e., the Surfynols(R) series of Air Products), primary ethoxylated alcohols (i.e. Clariant's Genapol® series) and secondary ethoxylated alcohols (i.e. the Tergitol(R) series of Union Carbide), sulfosuccinates (i.e. the Aerosol(R) series of Cytec), organosilicones (i.e. the Silwet(R) series of GE Silicons) and fluorinated surfactants (i.e. the Zonyl(R) series of DuPont). In particular, in the black ink according to the first object of the invention, the surfactants, if present, are used in amounts ranging from 0.01 to 5% by weight, preferably from 0.2 to 2% by weight, still more preferably between 0.2 and 3% by weight, based on the total weight of the ink.

Dispersing polymers suitable as additives are, for example, polymers soluble or dispersible in the aqueous vehicle, and may be ionic or non-ionic. Suitable classes of polymers may be acrylic, styrene-acrylic polymers and polyurethanes. Commercial polymers that fall within the above chemical classes and are suitable for use in the ink of the present invention are for example the DISPERBYK-190, marketed by BYK-Chemie GmbH and the Joncryl series marketed by BASF SE.

In particular, in the black ink according to the first object of the invention, the dispersing polymers, if present, are used in amounts of less than 15% by weight based on the total weight of the ink, preferably in an amount ranging from 1 to 10%, more preferably from 1 to 6%, still more preferably 4% by weight, based on the total weight of the ink.

Biocides suitable as additives include for example Proxel GXL (marketed by Lonza LTD).

pH regulators suitable as additives include, for example, tris(hydroxymethyl)-aminomethane ("Trizma" or "Tris"), TEA (triethanolamine) and 2-amino-2-methylpropan-1-ol (AMP95, marketed by Dow Chemical Company).

Sequestering agents suitable as additives include ethylenediaminetetraacetic acid (EDTA), imminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanodiaminatetraacetic acid (CyDTA), ethylenetriamine-N,N,N',N'',N''-pentaacetic acid (DTPA), glycoletherdiamine-N,N,N',N'-tetraacetic acid (GEDTA), and salts thereof.

According to a particularly preferred embodiment of the black ink according to the first object of the invention, this comprises as additive agents a pH regulator preferably 2-amino-2-methylpropan-1-ol, a surfactant, preferably an ethoxylated acetylenic diol, and a dispersing polymer, preferably the polymer marketed under the brand name DISPERBYK-190, consisting of a 40% solution in water of a high molecular weight block copolymer with pigment affinic groups. The amounts of surfactant and polymer are calibrated so as to preferably reach the preferred surface tension and viscosity values indicated above.

Preferably, in the black ink according to the first object of the invention, pH has a value of between 6 and 9, preferably between 7 and 8, still more preferably of 7.5.

A particularly preferred formulation of the black ink according to the present invention comprises:

5.2% by weight of disperse blue 291 and/or disperse blue 291:1;
1.8% by weight of disperse red 82;
3% by weight of disperse red 54;
8.5% by weight of glycerol;
2% by weight of propylene glycol;
4% of dispersing polymer;
from 71% to 80% by weight of water.

Preferably, said formulation further comprises a pH regulator, preferably 2-amino-2-methylpropan-1-ol, a surfactant, preferably an ethoxylated acetylenic diol and a biocide. The amounts of surfactant and polymer are preferably calibrated so as to reach the preferred surface tension and viscosity values indicated above.

As will be shown in the experimental section, the black ink according to the first object of the invention, printed on a fabric in different amounts per unit of surface, shows a value of L* always lower than that of comparative black inks printed in equal amounts, in particular for low amounts deposited.

A third object of the present invention is a method for inkjet-printing on fabric using a black ink according to the first object of the invention or an ink set according to the second object of the invention.

Preferably, said method comprises the following steps:

(a) providing an inkjet printer responsive to digital signals,
(b) loading the printer with a fabric to be printed,
(c) loading the printer with a black ink according to the first object of the invention or an ink set according to the second object of the invention,
(d) printing the fabric by using said ink in response to a digital signal, and, optionally,
(e) fixing the dispersed ink,
(f) washing the digitally printed fabric, Preferably, according to the third object of the invention, the printer is loaded with an ink set according to the second object of the invention.

A fourth object of the present invention is the use of a black ink according to the first object of the invention or of an ink set according to the second object of the invention in inkjet-printing, preferably of fabrics.

According to the third and fourth objects of the invention, the fabric is made of polyester and/or polyester blend. An example of a polyester fabric is Georg+Otto Friedrich, 6050 KBC, 100% polyester, 115 g/m$^2$ pre-treated for direct printing, so that the ink applied during inkjet-printing is absorbed on the fabric itself. Suitable pre-treatments are known to those skilled in the art and are applied by known methods, e.g. by dipping or spraying. After pre-treatment, the fabric is generally dried by conventional methods, generally at a temperature of less than 100° C. until the fabric is dry.

According to the third and fourth objects of the invention, printing is preferably carried out by means of an inkjet printer with DOD technology, for example a printer selected from Artistri® 2020 and 3210 Textile (E.I. du Pont de Nemours), Textile Jet (Mimaki), Display-Maker Fabrijet (MacDermid Color Span), Amber, Zircon, Amethyst and Pike (Stork), JP and Lario series (MS Printing Solutions), Rhotex (Durst), Vutek (Efi), Renoir (Efi-Reggiani), Monnalisa (Robustelli).

The amount of ink applied to the fabric depends on the printer model and its resolution, and on the amount of ink needed to achieve a certain color. Based on these considerations, the amount in grams of ink printed per unit of area of the fabric for a given color is determined. In an embodiment according to the third and fourth objects of the invention, 0.5 to 20 grams of ink per m$^2$ of fabric are applied. The fabric printed according to the third and fourth objects of the invention is post-treated by methods known to the man skilled in the art. Preferably, the fabric is maintained at 25° C. and at a relative humidity of less than 50% before color fixation. Fixation can be carried out by means of dry heat, preferably at 200° C. for 1 minute; vapour pressure, preferably at 140° C. for 25 minutes; or superheated steam, preferably at 170-180° C. for 7-10 minutes. After fixation, preferably the printed fabric is washed in cold water for 10-15 minutes. The excess dye is then removed by reduction using a solution of 1 g/liter of sodium hydroxide, 2 g/liter of sodium hydrosulphite and 1 g/liter of anionic surfactant for 10-15 minutes at 70° C. Any anionic surfactant suitable for washing dispersed dyes on polyester fabric can be used as an anionic surfactant.

A fifth object of the invention is a composition for preparing a black ink according to the invention comprising the following mixture of disperse dyes in an aqueous vehicle:

from 6 to 20%, preferably from 8 to 14%, still more preferably from 9 to 11%, still more preferably 10.4% by weight of disperse blue 291 and/or 291:1;
from 1 to 8%, preferably from 3 to 5%, still more preferably from 3.6% by weight of disperse red 82,
from 1 to 10%, preferably from 2 to 7%, still more preferably 6% by weight of disperse red 54,
based on the total weight of the composition.

In the composition according to the fifth object of the invention, the aqueous vehicle contains an aqueous solvent, which may be water or a mixture of water and at least one organic solvent. Preferably, the aqueous solvent is a mixture of water and glycerol. In the latter case, the composition comprises from 5 to 15%, preferably from 6 to 10%, still more preferably 8% by weight of glycerol, based on the total weight of the composition.

Still more preferably, said composition further comprises a dispersing polymer as described above. Preferably, such a dispersing polymer is present in amounts ranging from 5 to 30%, preferably from 6 to 15%, still more preferably 8% by weight, based on the total weight of the composition.

The composition according to the fifth object of the invention may be stored and used as an intermediate for the preparation of the black ink according to the first object of the invention by dilution with the remaining components thereof.

Experimental Part

Preparation of Concentrated Dye Dispersions 1 to 6

Concentrated dispersions of different dyes were prepared by mixing 20% by weight of disperse dye powder, 20% by weight of polymeric dispersant (DisperBYK 190), 8% by weight of glycerol, 2-amino-2-methylpropan-1-ol (AMP 95) as needed to bring the pH to 7.5, water as needed to 100%.

In particular, six different concentrated dispersions were prepared:

concentrated dye dispersion 1 comprised 20% by weight of disperse blue 291:1 (DB291:1);

concentrated dye dispersion 2 comprised 20% by weight of disperse red 82 (DR82);

concentrated dye dispersion 3 comprised 20% by weight of disperse red 54 (DR54);

the concentrated dye dispersion 4 comprised 20% by weight of disperse yellow 114 (DY114);

concentrated dye dispersion 5 comprised 20% by weight of disperse orange 29 (DO29);

concentrated dye dispersion 6 comprised 20% by weight of disperse blue 79:1 (DB79:1).

The concentrated dye dispersions 1 to 6 were then ground by means of a microsphere mill until to reach a mean particle size between 0.05 and 0.3 microns.

Preparation of Black Dye Dispersions

By suitably mixing the concentrated dye dispersions, prepared as described above, 3 different black formulations were obtained having the following composition, in terms of percentages by weight based on the total weight of the resulting black preparation:

Black Dispersion According to the Invention (BLACK DISP INV):

52% concentrated dispersion of disperse blue 291:1 (DB291:1)

18% concentrated dispersion of disperse red 82 (DR82), and

30% concentrated dispersion of disperse red 54 (DR54).

Comparative Black Dispersion 1 (COMP BLACK DISP1):

30% concentrated dispersion of disperse red 54 (DR54)

10% concentrated dispersion of disperse yellow 114 (DY114), and

60% concentrated dispersion of disperse blue 79:1 (DB79:1).

Comparative Black Dispersion 2 (COMP BLACK DISP2):

46% concentrated dispersion of disperse blue 291:1 (DB291:1)

22% concentrated dispersion of disperse red 82 (DR82), and

32% concentrated dispersion of disperse orange 29 (DO29).

Preparation of Black Inks

Three black inks were prepared, one according to the invention (INV ink) and two comparative ones (COMP1 ink 1 and COMP2 ink) by adding to 4.5 parts of glycerol, under continuous stirring and mixing to uniformity, 0.2 parts of a biocide (Proxel GXL), 50 parts of black dye dispersion prepared as indicated above, 2 parts of propylene glycol, 0.5 parts of an acetylenic surfactant (Surfynol 440) and water as needed to 100.

In the ink of the invention (INV ink), the black dispersion BLACK DISP INV was used, in comparative black ink 1 (COMP1 ink), the black dispersion COMP BLACK DISP1 was used and in comparative black ink 2 (COMP2 ink), the COMP BLACK DISP2 was used.

The composition and properties of the black ink according to the invention (INV ink) and of the comparative inks 1 and 2 (COMP1 ink and COMP2 ink) are shown in Table 1.

TABLE 1

|  | INV ink | COMP1 ink | COMP2 ink |
|---|---|---|---|
| Components |  |  |  |
| Inv. Black Disp. | 50 |  |  |
| COMP1 Black Disp. |  | 50 |  |
| COMP2 Black Disp. |  |  | 50 |
| Glycerol | 4.5 | 4.5 | 4.5 |
| Proxel GXL | 0.2 | 0.2 | 0.2 |
| Propylene glycol | 2 | 2 | 2 |
| Surfynol 440 | 0.5 | 0.5 | 0.5 |
| Water | As needed 100 | As needed 100 | As needed 100 |
| Properties |  |  |  |
| pH | 7.5 | 7.5 | 7.5 |
| Viscosity (mPa*s 25° C.) | 6.0 | 6.4 | 6.1 |
| Surface tension | 30.1 | 30.3 | 30.1 |

As can easily be seen, the 3 inks contain the same % by weight of dye.

Printing of Black Inks on Polyester Fabrics

The inks obtained were filtered and, when necessary, degassed.

Each of these inks was then applied to a polyester fabric (Georg+Otto Friedrich, 6050 KBC, 100% polyester, 115 g/m$^2$ pre-treated for direct printing) using an MS JP5 printer in C mode; with each ink, different areas of the fabric were printed with different amounts of ink.

After printing, the color was fixed with steam at 170° C. for 10 minutes, then the fabric was stripped in a reducing bath and washed.

Color Measurement on Polyester Fabrics

Fabrics with printed inks (fabric printed with INV ink, fabric printed with COMP1 ink, fabric printed with COMP2 ink) were analyzed using a Datacolor DATAFLASH DF110 spectrophotometer using the L*a*b* coordinates. The results of the L*, a* and b* readings for the different amounts of ink deposited are shown in Table 2. Table 2 also shows the differences between the values of L* measured on fabrics printed with each of the comparative inks, COMP1 ink or COMP2 ink, and the corresponding value of L* measured on the fabrics printed with the ink according to the invention, indicated respectively with ΔL*1 and ΔL*2.

TABLE 2

| Amount of ink deposited (g/m$^2$) | Sample analyzed | L* | a* | b* | ΔL*1 (L*COMP1 − L* INV) | ΔL*2 (L*COMP2 − L* INV) |
|---|---|---|---|---|---|---|
| / | Unprinted fabric | 91.13 | 1.73 | −12.14 |  |  |
| 9.06 | Fabric printed with INV ink | 24.21 | 0.59 | −2.62 | 0.04 | 1.30 |
|  | Fabric printed with COMP1 ink | 24.25 | −0.24 | −0.67 |  |  |
|  | Fabric printed with COMP2 ink | 25.51 | 0.03 | −2.35 |  |  |

TABLE 2-continued

| Amount of ink deposited (g/m²) | Sample analyzed | L* | a* | b* | ΔL*1 (L*COMP1 − L* INV) | ΔL*2 (L*COMP2 − L* INV) |
|---|---|---|---|---|---|---|
| 5.32 | Fabric printed with INV ink | 25.46 | 1.91 | −4.50 | 0.80 | 4.53 |
|  | Fabric printed with COMP1 ink | 26.26 | −0.31 | −1.53 |  |  |
|  | Fabric printed with COMP2 ink | 29.99 | −0.13 | −3.04 |  |  |
| 2.76 | Fabric printed with INV ink | 29.16 | 3.29 | −7.12 | 8.09 | 12.87 |
|  | Fabric printed with COMP1 ink | 37.25 | −1.11 | −4.15 |  |  |
|  | Fabric printed with COMP2 ink | 42.03 | −0.65 | −4.31 |  |  |
| 1.47 | Fabric printed with INV ink | 36.60 | 4.60 | −8.47 | 9.66 | 14.64 |
|  | Fabric printed with COMP1 ink | 46.26 | −1.51 | −5.78 |  |  |
|  | Fabric printed with COMP2 ink | 51.24 | −0.70 | −5.05 |  |  |
| 0.70 | Fabric printed with INV ink | 49.44 | 4.91 | −9.90 | 8.57 | 20.19 |
|  | Fabric printed with COMP1 ink | 58.01 | −1.12 | −7.54 |  |  |
|  | Fabric printed with COMP2 ink | 69.63 | 2.49 | −13.49 |  |  |

As can be seen from the data shown in Table 2, the fabric samples printed with the black ink according to the invention have lower L* values than those of the unprinted fabric.

Moreover, the color of the fabric printed with the black ink of the invention has a lower L* value compared to comparative inks, not only when the fabric is printed with large amounts but particularly for small amounts. In other words, the data shown in Table 2 show that the black color of the fabric printed with the black ink of the invention lightens much less than the comparative ones, with the progressive decrease of the printed amount.

The invention claimed is:

1. A black ink for use in inkjet printing, the black ink comprising a mixture of the dyes:
   disperse blue 291, disperse blue 291:1, or both,
   disperse red 82, and
   disperse red 54.

2. The black ink according to claim 1, wherein said mixture is dispersed in an aqueous vehicle comprising an aqueous solvent.

3. The black ink according to claim 2, comprising, based on the total weight of the ink:
   70 to 98% by weight of said aqueous vehicle, and
   2 to 30% by weight of said mixture of dyes.

4. The black ink according to claim 1, comprising, based on the total weight of the ink:
   3 to 10% by weight of disperse blue 291, disperse blue 291:1, or both,
   0.5 to 4% by weight of disperse red 82, and
   0.5 to 5% by weight of disperse red 54.

5. The black ink according to claim 1 having a surface tension between 20 and 40 mN/m at 25° C., a viscosity between 3 and 9 mPa*s at 25° C., or both.

6. The black ink according to claim 2, wherein said aqueous solvent consists of a mixture of water and an organic solvent.

7. The black ink according to claim 6, wherein said aqueous solvent consists of a mixture of water, glycerol, and propylene glycol.

8. The black ink according to claim 7, comprising, based on the total weight of the ink, 2 to 15% by weight of glycerol, 1 to 3% by weight of propylene glycol, and 60 to 90% by weight of water.

9. The black ink according to claim 1, further comprising a pH regulator, a surfactant, and a dispersing polymer.

10. A composition for preparing a black ink according to claim 1, the composition comprising a mixture of dyes dispersed in an aqueous vehicle, the mixture of dyes comprising:
   6 to 20% by weight of disperse blue 291, disperse blue 291:1, or both;
   1 to 8% by weight of disperse red 82, and
   1 to 10% by weight of disperse red 54,
   based on the total weight of the composition.

11. The composition according to claim 10, wherein the aqueous vehicle consists of a mixture of glycerol and water.

12. The composition according to claim 11, further comprising a dispersing polymer.

13. The composition according to claim 11, comprising 5 to 15% by weight of glycerol, based on the total weight of the composition.

14. The composition according to claim 12, comprising 5 to 30% by weight of the dispersing polymer, based on the total weight of the composition.

15. The black ink according to claim 1, wherein a pH of the black ink is between 6 and 9.

16. An ink set comprising:
   the black ink according to claim 1, and
   at least one colored ink selected from the group consisting of cyan, magenta, yellow, red, violet, orange, and blue, wherein the at least one colored ink comprises at least one disperse dye in an aqueous vehicle.

17. The ink set according to claim 16, wherein:
   the cyan ink comprises at least one disperse dye selected from the group consisting of DB60, DB56, DB27, DB87, DB257, and DB367,
   the magenta ink comprises at least one disperse dye selected from the group consisting of DR76, DR92, DR86, DR89, DR5, DR75, DR121, DR127, DR132, DR145, DR159, DR164, DR179, DR184, DR189, and DR191,
   the yellow ink comprises at least one disperse dye selected from the group consisting of DY5, DY42, DY33, DY50, DY59, DY114, DY79, DY83, DY98, DY100, DY122, DY139, DY140, DY160, DY199, DY201, DY204, DY206, DY224, and DY231,
   the red ink comprises at least one disperse dye selected from the group consisting of DR54, DR177, DR229, and DR258,
   the violet ink comprises at least one disperse dye selected from the group consisting of DV26, DV57, and DV37,
   the orange ink comprises at least one disperse dye selected from the group consisting of DO44, DO29, and DO30.

18. A method for inkjet-printing a fabric, the method comprising:
   (a) providing an inkjet printer responsive to digital signals,
   (b) loading the printer with a fabric to be printed, (c) loading the printer with the black ink according to claim 1, and
(d) printing the fabric by using said ink in response to a digital signal.

19. The method according to claim 18, wherein the fabric is made of polyester or polyester blend.

20. The method according to claim 18, further comprising:
(e) fixing the ink printed on the fabric by heat, and
(f) washing the digitally printed fabric.

21. A method for ink-jet printing a fabric, the method comprising:
(a) providing an inkjet printer responsive to digital signals,
(b) loading the printer with a fabric to be printed,
(c) loading the printer with the ink set according to claim 16, and
(d) printing the fabric using said ink set in response to a digital signal.

* * * * *